(12) United States Patent
Kasashima et al.

(10) Patent No.: US 7,547,258 B2
(45) Date of Patent: Jun. 16, 2009

(54) GOLF BALL

(75) Inventors: Atsuki Kasashima, Chichibu (JP); Katsunori Sato, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/645,552

(22) Filed: Dec. 27, 2006

(65) Prior Publication Data
US 2008/0161135 A1 Jul. 3, 2008

(51) Int. Cl.
*A63B 37/12* (2006.01)
(52) U.S. Cl. .................................... 473/383
(58) Field of Classification Search .......... 473/383–385
See application file for complete search history.

(56) References Cited

U.S. PATENT DOCUMENTS

| | | | |
|---|---|---|---|
| 4,744,564 A | 5/1988 | Yamada | |
| 5,902,193 A | 5/1999 | Shimosaka et al. | |
| 2003/0050138 A1 * | 3/2003 | Kasashima | 473/384 |

FOREIGN PATENT DOCUMENTS

| | | |
|---|---|---|
| JP | 6-7875 B2 | 2/1994 |
| JP | 10-99468 A | 4/1998 |
| JP | 2000-325499 A | 11/2000 |

* cited by examiner

*Primary Examiner*—Raeann Trimiew
(74) *Attorney, Agent, or Firm*—Sughrue Mion, PLLC

(57) ABSTRACT

The invention provides a golf ball that is molded using a golf ball mold composed of a pair of mold halves, each having a hemispherical cavity, which when separably mated form an interior spherical cavity, the golf ball comprising a surface that includes an equator located at a place which corresponds to the parting line of the mold and a pole located at each of two vertices on either side of the equator, wherein the ball has on the surface thereof one or more dimple that lies across the equator and additionally has, at and near the poles, dimples some or all of which are formed to either a shallower depth or a smaller volume than dimples of the same diameter in other regions. The invention enables golf balls having numerous dimples formed thereon to be efficiently produced with a split mold. The golf balls thus obtained have a high symmetry performance.

18 Claims, 6 Drawing Sheets

(A)

(B)

FIG.2
(A)
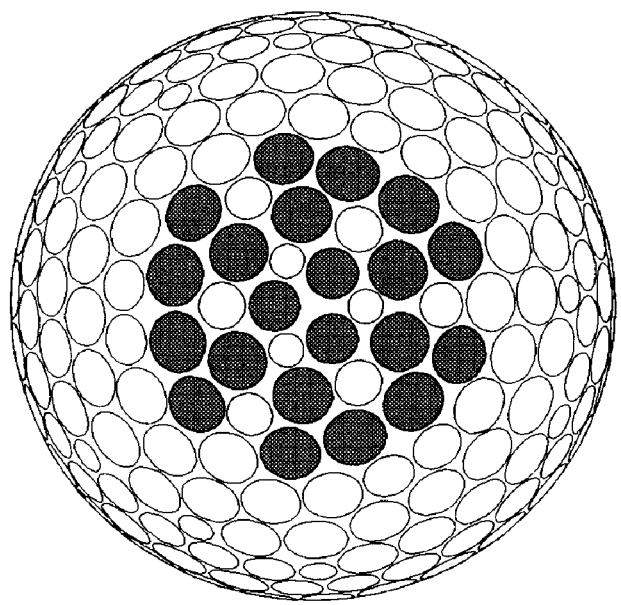
(B)
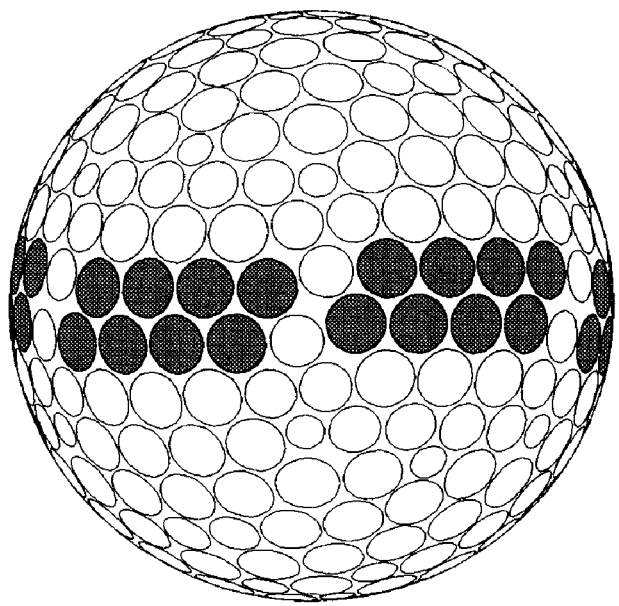

FIG.4
(A)
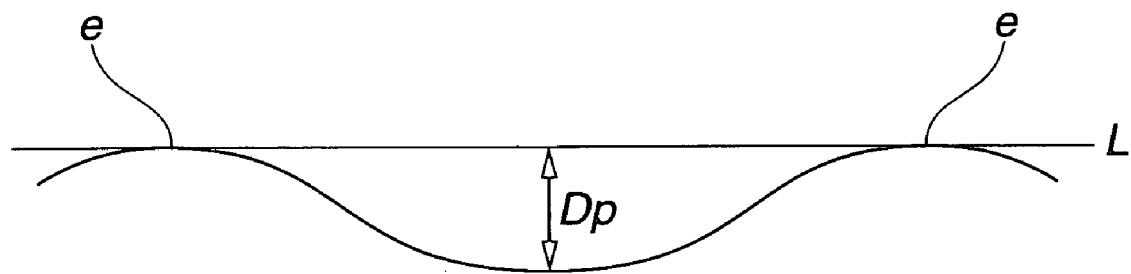
(B)
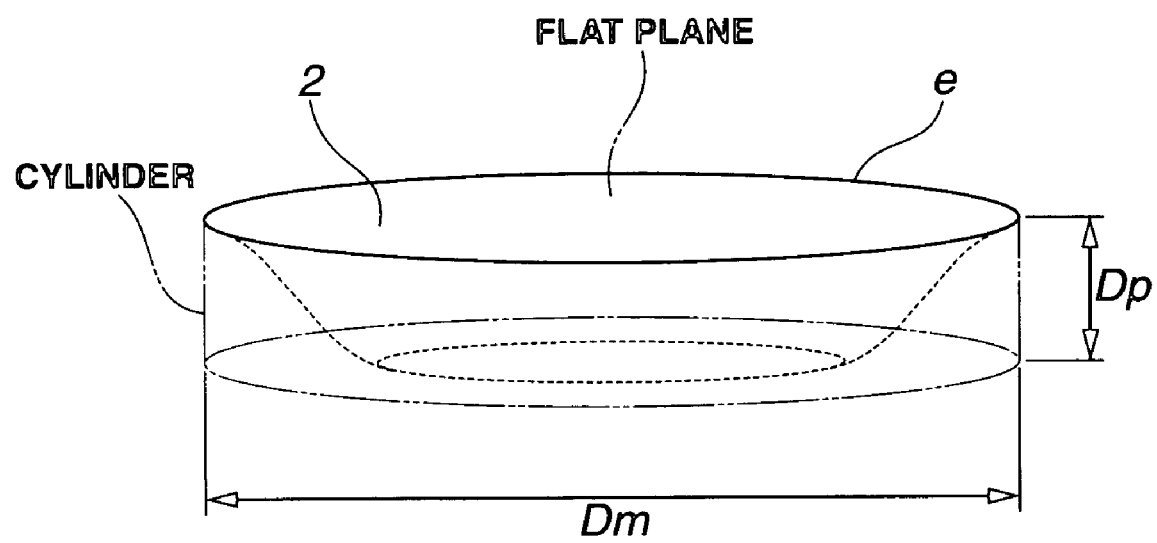

FIG.5
(A)
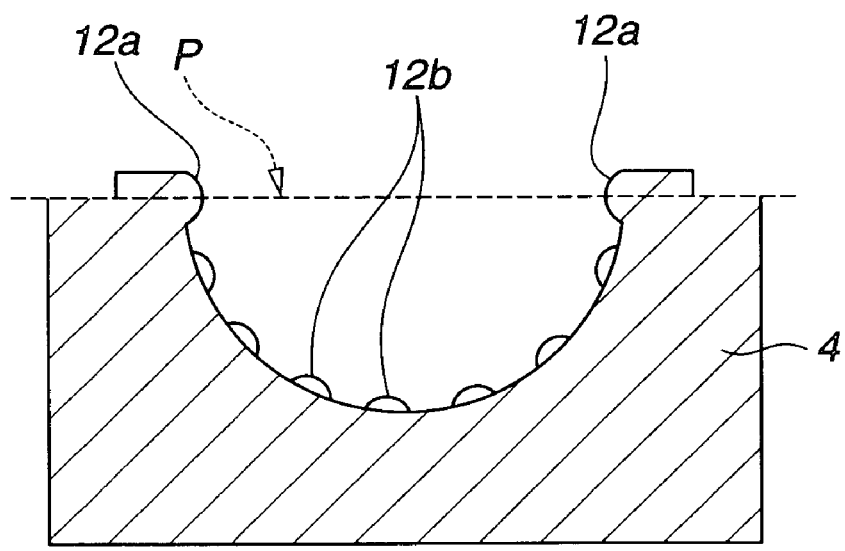
(B)
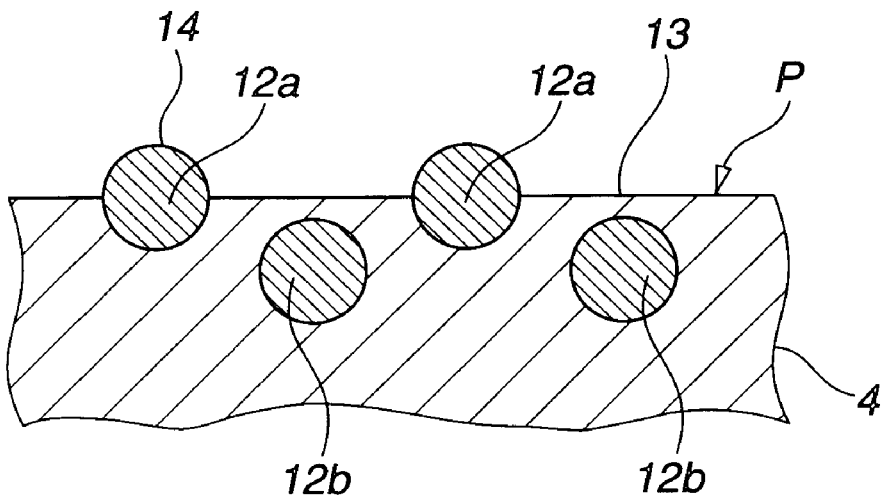

FIG.6
(A)
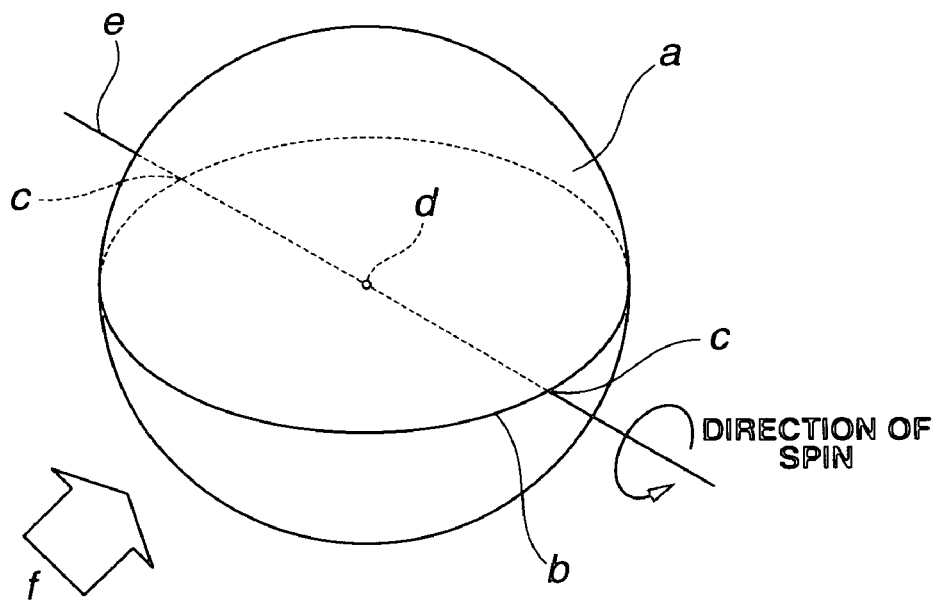
(B)
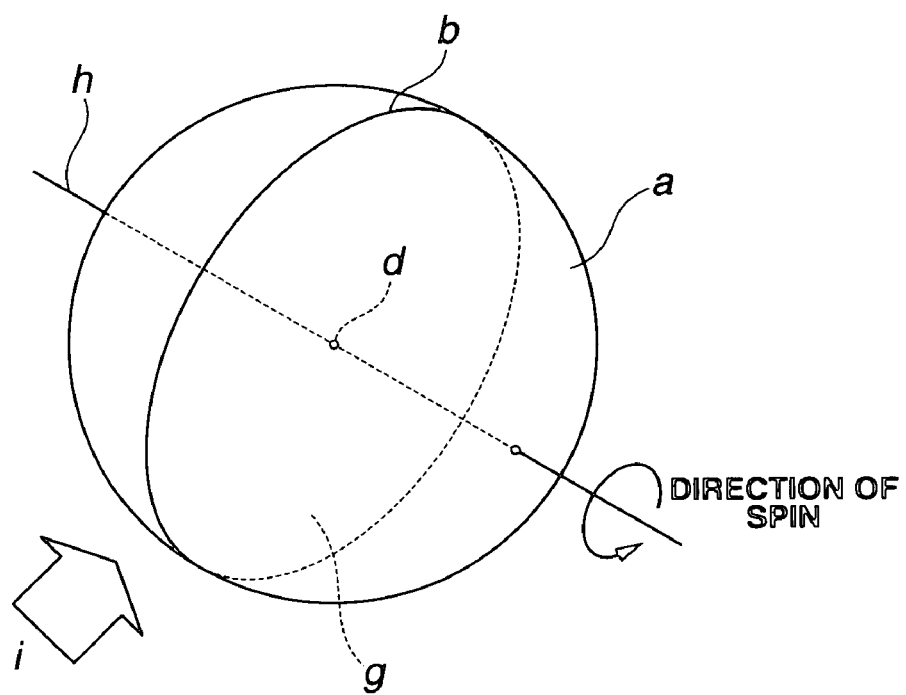

GOLF BALL

BACKGROUND OF THE INVENTION

The present invention relates to a golf ball which has numerous dimples on the surface and is endowed with a high symmetry performance.

Numerous dimples are usually arranged on the surface of a golf ball. These dimples are formed by using a two-part mold having a spherical cavity defined by an inside wall having numerous dimple-forming projections thereon, which spherical cavity splits into upper and lower hemispherical halves.

When numerous dimples are formed on the surface of the ball by a molding process such as injection molding using a two-part mold, it has been difficult to place dimples on the parting line of the mold. A belt-like land area called the seam line thus appears at the equator on the surface of the ball.

A number of innovations have been proposed recently for further enhancing the aerodynamic performance of the ball due to the dimples, and for tightly arranging the dimples even on the seam line.

In addition, efforts are being made to achieve substantially the same effective total dimple volume, regardless of whether the golf ball is "pole shot" so that it spins pole over pole (with the axis of rotation lying on the equatorial plane) or "seam shot" so that it spins pole horizontal (with the axis of rotation being the line connecting the poles) (see JP-B 6-7875).

However, because a golf ball is generally molded with a mold, at the interior of which is formed a spherical cavity, by separably mating together two equally split mold halves and is fabricated with axial symmetry, the ball tends to have a high degree of roundness about a polar axis corresponding to a line that connects the respective vertices within the cavities of the two mold halves, and conversely tends to have a low degree of roundness about an axis present on the plane which is circumscribed by the seam line and corresponds to the parting surface of the mold. In prior-art golf balls, owing to such differences in roundness, the flight performance of a ball will sometimes vary depending upon which part of the ball is struck by the club when the ball is played. In competitive play where, according to the rules of the game, a ball cannot be moved except under special circumstances and must be played in exactly the condition in which it is found, such variability in the flight performance is a major concern.

That is, when a golf ball is hit, although the spin rate of the ball differs depending on the number of the golf club, a back spin invariably arises. Referring to FIGS. 6A and B, depending on what part of the ball is hit, shots taken with the ball can be broadly divided into "pole shots" (FIG. 6A) in which the golf ball a is struck f in such a manner as to give rise to backspin about an axis of rotation which is a straight line e that connects three points: two mutually opposed points c and a on the seam line b of the ball a and a center point d; and "seam shots" (FIG. B) in which the golf ball a is struck i in such a way as to give rise to backspin about an axis of rotation which is a straight line h that is orthogonal to the circular flat plane g circumscribed by the seam line b of the ball a and passes through the center d of the ball a. As noted above, in a pole shot (FIG. 6A), the ball lacks roundness about the axis of rotation e, and thus is readily subject to superfluous lift and drag forces. On the other hand, in a seam shot (FIG. 6B), the ball is almost perfectly round about the axis of rotation h, and thus experiences substantially no superfluous lift and drag forces. Therefore, if a golf ball has simply been designed so that the dimple effects on pole shots and on seam shots are equivalent, disruption of the roundness on a pole shot will lead to a larger dimple effect, subjecting the golf ball to superfluous lift and drag and resulting in a flight performance which differs from that of a seam shot. Variations in the flight performance will thus arise depending on where the ball it hit.

Therefore, to obtain a golf ball having an excellent symmetry performance with no variation in flight performance depending on where the ball is hit, it has been desired that the dimple arrangement and dimple shapes be designed with the roundness of the ball in mind so as to optimize the dimple effects.

Various art that calibrates the symmetry performance has been disclosed, such calibration predominantly being carried out in the equatorial region of the ball. For example, JP-A 2000-325499 discloses art in which, by providing numerous dimples in the equatorial region of the ball which are deeper than the dimples present in other regions, dimples in the equatorial region are formed to an average depth which is from 5 to 50 μm greater than the average depth of dimples in the other regions. JP-A 10-99468 describes art in which dimples that lies across the parting line are given an average value for depth/diameter which is larger than the corresponding average value for dimples not on the parting line.

In the foregoing art, the symmetry performance is enhanced by making the dimples arranged on or near the ball equator deeper than dimples in other regions, but when the dimples near the equator are made too deep, the molded ball is more difficult to remove from the mold, resulting in a lower work efficiency. As a result, such art lacks practical effectiveness in golf ball production.

SUMMARY OF THE INVENTION

It is therefore an object of the present invention to provide a golf ball endowed with an excellent symmetry performance, which ball has numerous dimples formed thereon yet can be efficiently manufactured with a split mold.

Accordingly, in a first aspect, the invention provides a golf ball that is molded using a golf ball mold composed of a pair of mold halves, each having a hemispherical cavity, which when separably mated form an interior spherical cavity, the golf ball comprising a surface that includes an equator located at a place which corresponds to the parting line of the mold and a pole located at each of two vertices on either side of the equator. The ball has on the surface thereof one or more dimple which lies across the equator, and additionally has, at and near the poles, dimples some or all of which are formed to a shallower depth than dimples of the same diameter in other regions.

In second aspect, the invention provides a golf ball that is molded using a golf ball mold composed of a pair of mold halves, each having a hemispherical cavity, which when separably mated form an interior spherical cavity, the golf ball comprising a surface that includes an equator located at a place which corresponds to the parting line of the mold and a pole located at each of two vertices on either side of the equator. The ball has on the surface thereof one or more dimple which lies across the equator, and additionally has, at and near the poles, dimples some or all of which are formed to a smaller volume than dimples of the same diameter in other regions.

Preferred embodiments of the inventive golf balls include I to IV below.

I. Golf balls wherein dimples at the equator and vicinity thereof are formed to greater depths that dimples of the same diameter in other regions.

II. Golf balls wherein dimples at the equator and vicinity thereof have a larger volume than dimples of the same diameter in other regions.

III. Golf balls wherein at least one-half of the total number of dimples which lie across the equator are dimples having a diameter of at least 3.9 mm.

IV. Golf balls wherein the dimples which lie across the equator extend across the equator by an amount is in a range of from 5 to 50% of the dimple diameter.

BRIEF DESCRIPTION OF THE DIAGRAMS

FIG. 1 is a schematic cross-sectional view of a golf ball mold.

FIG. 2 presents (A) a plan view of the vicinity of a polar region, and (B) a plan view of the vicinity of the equatorial region, on the surface of a golf ball according to an embodiment of the invention.

FIG. 4 illustrates the depth and volume of a single dimple.

FIG. 5A is a cross-sectional view of a mold bottom half for explaining dimples arranged on the seam line. FIG. 5B is a partial, enlarged, view of the parting surface portion of the bottom mold half.

FIG. 6 depicts the ball when it is pole shot (A) and when it is seam shot (B).

DETAILED DESCRIPTION OF THE INVENTION

The invention is described more fully below in conjunction with the diagrams.

Figure 1:
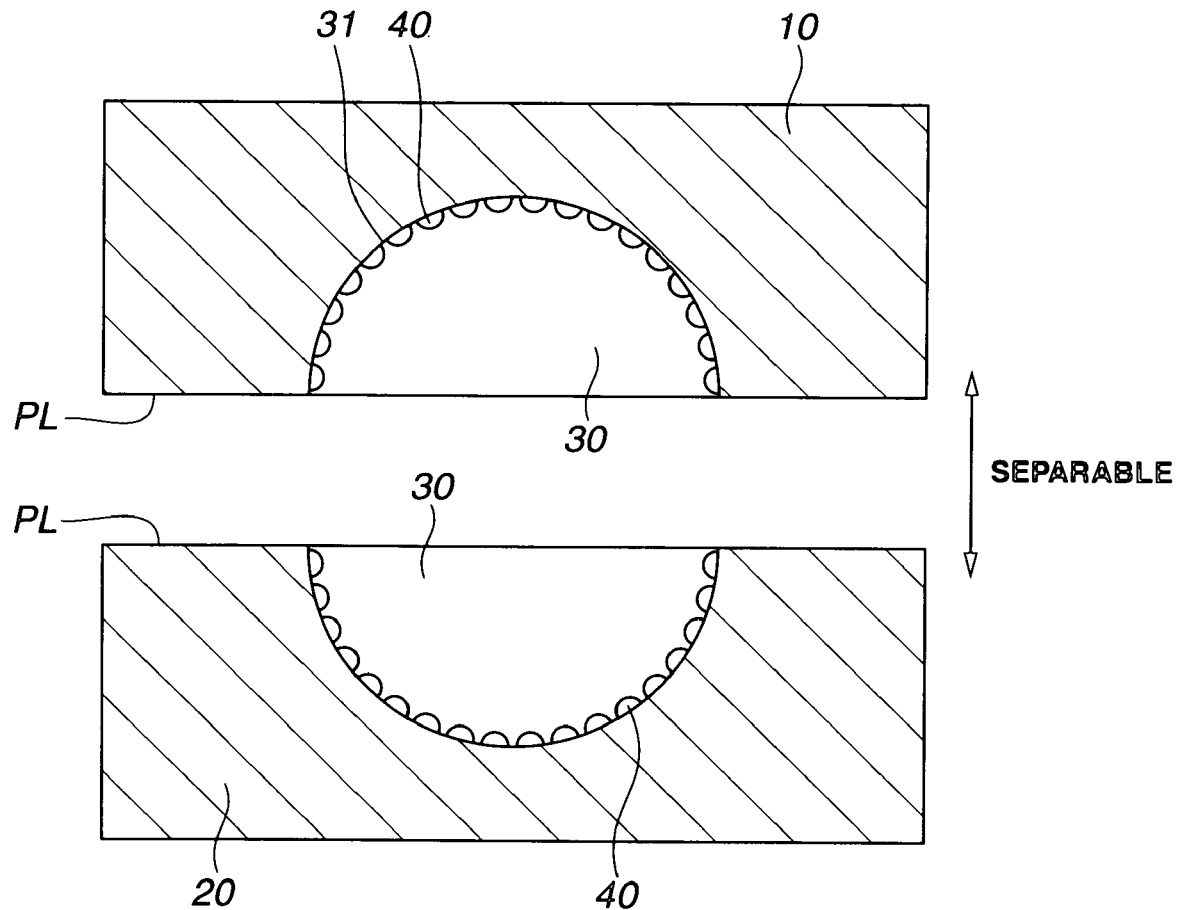

FIG. 1 is a schematic cross-sectional view of a golf ball mold. The mold has a top half 10 and a bottom half 20. By separably mating both mold halves 10 and 20, a spherical cavity 30 is formed at the interior. The cavity 30 has a wall 31 on which are formed numerous dimple-forming projections 40. The runners, gates, support pins, vent pins and other parts typically disposed around the cavity 30 have been omitted in FIG. 1, although the types, numbers and arrangements thereof may be handled similarly as in the prior art.

The golf ball of the invention is an article that has been molded using a mold like that described above which is composed of a pair of mold halves, each having a hemispherical cavity. On a surface of the ball, referring to the two vertices on either side of a place corresponding to the parting line of the mold (equator) as the "poles," the golf ball of the invention is characterized by the design of the dimples in dimple regions at and near these poles.

That is, the ball is characterized in that some or all of the dimples located at and near the poles on the ball's surface are formed to shallower depths than dimples of the same diameter in other regions. An example would be that where, as shown in FIG. 2A, the blackened dimples are formed to a shallower depth than the dimples in other regions.

In FIG. 2A, the blackened dimples at and near the poles are of two types, some having a large diameter and others having a medium diameter. According to the invention, these dimples are formed to shallower depths than dimples of substantially the same respective diameters that are present in regions other than at or near the poles.

Figure 3:
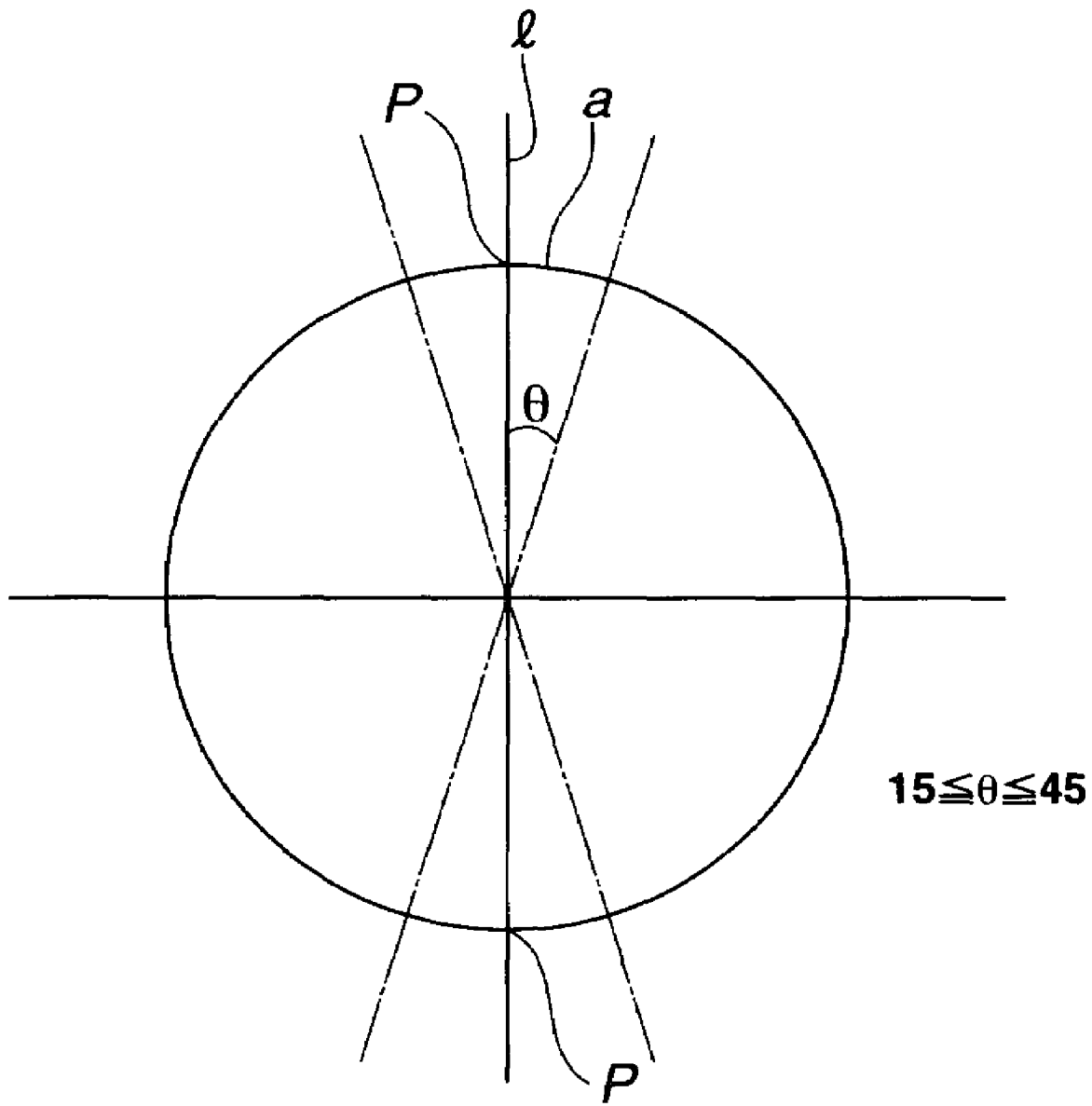
FIG. 3 shows the positions of dimples at and near the polar regions.

Referring to FIG. 3, the regions at and near the poles mentioned above are defined here as regions of the ball's surface a where the ball center angle θ with respect to an axis l passing through both poles P falls within a range of 15 to 45°. What is of concern here are those dimples whose centers are located within these regions.

The dimples within the polar regions are formed to shallower depths than dimples of the same diameter in other regions. Although the degree of such shallowness is not subject to any particular limitation, it is preferable for the dimples within the polar regions to be formed so as to be from 5 to 50 μm more shallow.

Here, "dimple depth," as illustrated in FIG. 4A, signifies the depth Dp of the deepest portion of a dimple from a straight line L which connects the highest points e and e on the land surrounding the dimple.

In the present invention, it is preferable for the dimple depth Dp to be selected from a range of from 0.05 to 0.4 mm. Here, the dimples at and near the poles are made shallower than the average depth of dimples in other regions, the polar dimples preferably being formed so as to be from 5 to 50 μm more shallow. The dimple diameter Dm may be selected from a range of from 1.0 to 8.0 mm, and especially from 2.0 to 7.0 mm. The number of dimple types having mutually differing diameters, while not subject to any particular limitation, is preferably set to from 3 to 30, and more preferably from 5 to 20.

Alternately, in the present invention, some or all of the dimples at and near the poles on the surface of the ball may be formed so as to have a smaller volume than dimples of the same diameter in other regions.

As shown in FIG. 4B, the dimple volume is the volume of a dimple from a flat plane circumscribed by the edge e of the dimple to the base of the dimple at a depth Dp.

Specifically, it is preferable to form the target dimples at and near the poles to a volume which is about 3 to 30% smaller than that of other dimples of the same diameter.

For example, in FIG. 2A, the blackened dimples are of two types, some having a large diameter and others having a medium diameter. According to the invention, these dimples are formed to volumes which are about 3 to 30% smaller than those of dimples of substantially the same respective diameters that are present in regions other than at or near the poles.

FIG. 5A shows the essential features of a bottom mold half 4 suitable for molding the inventive golf ball. The bottom mold half 4 has projections 12a for forming the dimples provided on the equator, each of which projections 12a has a tip that juts out from the cavity wall and a portion which extends above a parting surface P. The bottom mold half 4 additionally has other dimple-forming projections 12b provided at given positions on the cavity wall.

The parting surface P of the bottom mold half 4 is formed in a shape which, near the above projections 12a, follows the shapes of the projections. That is, referring to FIG. 5A, as viewed from inside the mold cavity, the parting surface P is a combination of straight lines 13 (areas without projections) and convex curved lines 14 (areas around projections). Although areas corresponding to projections 12a on the top mold half are not shown in the diagram, concave curved lines corresponding to the aforementioned convex curved lines 14 are similarly formed on the top mold half.

On golf balls molded with a laterally splitting mold, molding flash from the cover-forming resin tends to form at a position corresponding to the parting surface P of the mold. When such flash has formed, it is removed by carrying out a trimming operation. Because there is a risk of the dimples at and near the equator being abraded by the trimming operation, it is preferable to use large-diameter dimples in this region. In particular, it is preferable for at least 50% of the dimples which lie across the equator to be dimples having a diameter of 3.9 mm or more.

The amount by which the dimples extend over the equator in this way is preferably in a range of 5 to 50%, and more preferably from 10 to 40%, of the dimple diameter.

In the practice of the invention, dimples at and near the equator (equatorial region) may be made deeper than the average depth of dimples in other areas. In this case, the difference in depth may be set so that dimples in the equatorial region are generally from 5 to 50 μm, and especially from 10 to 40 μm, deeper. Moreover, dimples at and near the equator (equatorial region) may be given a larger volume than dimples in other areas. In this case, the difference in volume may be set so that dimples in the equatorial region are about 3 to 30% larger.

As used herein, "equatorial region" refers to the region in the vicinity of the equator. Although not specifically shown in the diagrams, the equatorial region may be defined as the region which is centered on the equator (corresponding to the parting surface of the mold) at a latitude of 0° and lies within a range in the latitude of ±10°. Dimples having at least one-half (50% or more) of the surface area present within the equatorial region may be regarded as equatorial region dimples, and dimples having less than 50% of the surface area present within the equatorial region may be regarded as dimples outside of the equatorial region.

For example, in FIG. 2B, the group of blackened dimples present in the equatorial region, which all have the same diameter, are formed 5 to 50 μm deeper, or are formed to a volume that is about 3 to 30% larger, than dimples of substantially the same diameter that are present in other regions outside of the equatorial region.

By arranging on the surface of the golf ball a plurality of dimples that lie across the equator, the symmetry performance can be further enhanced. Specifically, it is effective to set the number of dimples that lie across the equator within a range of from 20 to 70.

In the practice of the invention, it is preferable for the degree to which dimples formed in the above equatorial region are deeper than the average depth of dimples formed in other regions to fall within the above-indicated numerical range, both before and after the deflashing operation carried out immediately subsequent to demolding of the ball. In the as-molded ball immediately after it has been removed from the mold, when the depth of dimples within the region having a latitude of ±10° that includes the equator is from 5 to 50 μm deeper than the depth of dimples in the remaining regions that include the vicinities of both poles, unnecessary buffing of the lands should be avoided in the deflashing operation. When the depth is more than 50 μm deeper, the lands are buffed somewhat to bring the average difference in depth to 50 μm or less. In either case, the minimum difference in depth after buffing should be set to at least 5 μm.

To say that the dimples at and near the equator have a large depth does not necessarily mean that all of the dimples present in that region are deeper than dimples of the same diameter present in other regions. It is acceptable for a few of the dimples present at and near the equator to be more shallow than dimples of the same diameter present in other regions.

Regarding the construction of the inventive golf ball, the ball may be a one-piece ball which is entirely composed of a single resilient material such as a synthetic rubber, may have a two-piece construction or a multi-piece construction of three or more layers composed of a resilient core made of rubber or the like encapsulated within one resin cover or a plurality of different resin covers, or may have a thread-wound ball construction. Moreover, the core and cover materials which make up the internal construction of the golf ball are not subject to any particular limitation. Synthetic rubbers such as polybutadiene or polyisoprene and any of various known thermoplastic resins or thermoplastic elastomers such as ionomer resins, polyester elastomers and polyurethane resins may be suitably selected as the primary material and adjusted to the desired thickness and hardness according to the objects of each ball.

The number and arrangement of dimples are not subject to any particular limitation, although it is preferably for the number of dimples to be in a range of 200 to 600, and especially from 250 to 500.

The types and shapes of the numerous dimples formed on the surface of the ball are not subject to any particular limitation. In addition to circular dimples of the same or different types, non-circular dimples may be arranged on the surface of the ball. Even when non-circular dimples are used, the symmetry performance can be enhanced by suitable selection of the depths and volumes of the non-circular dimples. Preferred use may be made of dimples having a depth in a range of from 0.05 to 0.4 mm.

The method of forming dimples on the surface of the golf ball is exemplified by a method in which numerous projections corresponding to the shapes of the respective dimples are provided on the wall of the golf ball mold cavity and, by using this mold to carry out injection molding, dimples are formed on the surface of the cover. To fabricate such a mold, a technique may be employed in which, as is customary, three-dimensional CAD/CAM is used to directly cut the entire surface shape three-dimensionally into a master mold from which golf ball molds are subsequently made by pattern reversal, or to directly cut three-dimensionally the inside walls of the cavity for the golf ball mold.

The golf ball of the invention is preferably formed to a diameter and weight in accordance with the Rules of Golf. Typically, the diameter is not less than 42.67 mm and the weight is not more than 45.93 g.

As explained above, the golf ball of the invention has an excellent symmetry performance and, in particular, is able to achieve substantially the same trajectory regardless of whether it is hit as a pole shot or a seam shot. Moreover, the inventive golf ball can be manufactured while maintaining a good work efficiency.

EXAMPLES

Examples of the invention and Comparative Examples are given below by way of illustration, and not by way of limitation.

Examples 1 to 4

Comparative Example 1

In each example, a cover made of ionomer resin and having the same thickness was formed over a solid core so as to enclose the core, thereby giving golf balls having the dimples shown in Table 1 below (total of 336 dimples). The golf ball had a diameter of 42.7 mm and a weight of 45.5 g. Dimples of calibrated depth in the polar and equatorial regions and uncalibrated dimples are shown below in Tables 1 and 2. Details concerning the calibrations made in dimple depth and volume are given below in Table 3. The dimple arrangement shown in FIG. 2 ((A) Surface of ball near poles; (B) Surface of ball near equator) was used in each example.

TABLE 1

I. Uncalibrated dimples (total of 336)

| No. | Number | Diameter (mm) | Depth (mm) | Volume (mm³) | Total volume (mm³) |
|---|---|---|---|---|---|
| 1 | 24 | 4.6 | 0.15 | 1.19 | |
| 2 | 198 | 4.4 | 0.15 | 1.08 | |
| 3 | 12 | 3.9 | 0.15 | 0.86 | |
| 4 | 66 | 3.8 | 0.14 | 0.76 | |
| 5 | 12 | 3.4 | 0.14 | 0.64 | |
| 6 | 18 | 2.8 | 0.11 | 0.32 | |
| 7 | 6 | 2.6 | 0.1 | 0.26 | |
| Total | 336 | | | | 317 |

TABLE 2

II. Calibrated dimples (total of 48)

| Region | Diameter (mm) | Number |
|---|---|---|
| Polar region | 4.6 | 12 |
| | 4.4 | 24 |
| | 3.8 | 6 |
| Equatorial region | 4.4 | 48 |

Note:
The number of dimples that lie across the equator is 24.

Using a swing robot under initial conditions adjusted so as to generate an initial velocity of 72 m/s and a backspin of 2,600 rpm, the golf balls obtained in the above examples of the invention and the comparative example were subjected to both pole shots (FIG. 6A) and seam shots (FIG. 6B), and the difference in carry therebetween was measured. The results are shown in Table 3.

TABLE 3

| Difference from standard dimple depth | | Comparative Example 1 P: +0 | | Example 1 P: −10 | | Example 2 P: −20 | | Example 3 P: −30 | | Example 4 P: −20 S: +20 | |
|---|---|---|---|---|---|---|---|---|---|---|---|
| (μm) | | Depth | Volume | Depth | Volume | Depth | Volume | Depth | Volume | Depth | Volume |
| Diameter | Region | (mm) | (mm³) | (mm) | (mm³) | (mm) | (mm³) | (mm) | (mm³) | (mm) | (mm³) |
| 4.6 mm | P | 0.15 | 1.19 | 0.14 | 1.12 | 0.13 | 1.05 | 0.12 | 0.99 | 0.13 | 1.05 |
| | O | 0.15 | 1.19 | 0.15 | 1.19 | 0.15 | 1.19 | 0.15 | 1.19 | 0.15 | 1.19 |
| 4.4 mm | P | 0.15 | 1.08 | 0.14 | 1.01 | 0.13 | 0.95 | 0.12 | 0.89 | 0.13 | 0.95 |
| | O | 0.15 | 1.08 | 0.15 | 1.08 | 0.15 | 1.08 | 0.15 | 1.08 | 0.15 | 1.08 |
| | S | | | | | | | | | 0.17 | 1.19 |
| 3.8 mm | P | 0.14 | 0.76 | 0.13 | 0.71 | 0.12 | 0.67 | 0.11 | 0.63 | 0.12 | 0.67 |
| | O | 0.14 | 0.76 | 0.14 | 0.76 | 0.14 | 0.76 | 0.14 | 0.76 | 0.14 | 0.76 |
| Angle of elevation P-S (°) | | 1.1 | | 0.7 | | 0.4 | | 0.1 | | −0.1 | |
| Carry P-S (m) | | 4.5 | | 2.5 | | 1.5 | | 0 | | 0 | |

P: Polar region
O: Regions other than polar and equatorial regions
S: Equatorial region
Note:
In the examples of the invention, the shapes of dimples within 15 polar regions of 30° were calibrated.

The invention claimed is:

1. A golf ball that is molded using a golf ball mold composed of a pair of mold halves, each having a hemispherical cavity, which when separably mated form an interior spherical cavity, the golf ball comprising a surface that includes an equator located at a place which corresponds to the parting line of the mold and a pole located at each of two vertices on either side of the equator, wherein the ball has on the surface thereof one or more dimple which lies across the equator and additionally has, at and near the poles, dimples some or all of which are formed to a shallower depth than dimples of the same diameter in the regions other than polar and equatorial regions.

2. The golf ball of claim 1, wherein dimples at the equator and vicinity thereof are formed to greater depths that dimples of the same diameter in other regions.

3. The golf ball of claim 1, wherein dimples at the equator and vicinity thereof have a larger volume than dimples of the same diameter in other regions.

4. The golf ball of claim 1, wherein at least one-half of the total number of dimples which lie across the equator are dimples having a diameter of at least 3.9 mm.

5. The golf ball of claim 1, wherein the dimples which lie across the equator extend across the equator by an amount in a range of from 5 to 50% of the dimple diameter.

6. A golf ball that is molded using a golf ball mold composed of a pair of mold halves, each having a hemispherical cavity, which when separably mated form an interior spherical cavity, the golf ball comprising a surface that includes an equator located at a place which corresponds to the parting line of the mold and a pole located at each of two vertices on either side of the equator, wherein the ball has on the surface thereof one or more dimple which lies across the equator and additionally has, at and near the poles, dimples some or all of which are formed to a smaller volume than dimples of the same diameter in the regions other than polar and equatorial regions.

7. The golf ball of claim 6, wherein dimples at the equator and vicinity thereof are formed to greater depths that dimples of the same diameter in other regions.

8. The golf ball of claim 6, wherein dimples at the equator and vicinity thereof have a larger volume than dimples of the same diameter in other regions.

9. The golf ball of claim 6, wherein at least one-half of the total number of dimples which lie across the equator are dimples having a diameter of at least 3.9 mm.

10. The golf ball of claim 6, wherein the dimples which lie across the equator extend across the equator by an amount in a range of from 5 to 50% of the dimple diameter.

11. The golf ball of claim 1, wherein some or all of the dimples formed at and near the poles are formed to a shallower depth than dimples of the same diameter in the regions between the poles and the equator.

12. The golf ball of claim 6, wherein some or all of the dimples formed at and near the poles are formed to a smaller volume than dimples of the same diameter in the regions between the poles and the equator.

13. The golf ball of claims 1, wherein the dimples have a depth of from 0.05 to 0.4 mm, and the dimples at and near the poles are 5 to 50 μm more shallow than the average depth of dimples in the other regions.

14. The golf ball of claim 1, wherein the volume of the dimples at and near the poles are 3 to 30% smaller than that of the other dimples of the same diameter.

15. The golf ball of claim 1, wherein the dimples at and near the equator and equatorial region have a volume 3 to 30% larger than dimples in the other areas.

16. The golf ball of claims 6, wherein the dimples have a depth of from 0.05 to 0.4 mm, and the dimples at and near the poles are 5 to 50 μm more shallow than the average depth of dimples in the other regions.

17. The golf ball of claim 6, wherein the volume of the dimples at and near the poles are 3 to 30% smaller than that of the other dimples of the same diameter.

18. The golf ball of claim 6, wherein the dimples at and near the equator and equatorial region have a volume 3 to 30% larger than dimples in the other areas.

\* \* \* \* \*